US009260126B2

(12) United States Patent
Ondrasik (10) Patent No.: US 9,260,126 B2
(45) Date of Patent: Feb. 16, 2016

(54) TUBULAR FRAME SHOPPING CART (71) Applicant: V. John Ondrasik, Commerce, CA (US)

(72) Inventor: V. John Ondrasik, Commerce, CA (US)

( * ) Notice: Subject to any disclaimer, the term of this patent is extended or adjusted under 35 U.S.C. 154(b) by 0 days.

(21) Appl. No.: 14/160,433

(22) Filed: Jan. 21, 2014

(65) Prior Publication Data

US 2015/0203139 A1 Jul. 23, 2015

(51) Int. Cl.
*B62B 3/14* (2006.01)
*B62B 5/00* (2006.01)

(52) U.S. Cl.
CPC ............... *B62B 3/144* (2013.01); *B62B 5/0006* (2013.01)

(58) Field of Classification Search
CPC .. B60B 2200/432; B62B 3/14; B62B 3/1404; B62B 3/144
USPC .............. 280/33.991, 33.993, 33.996, 33.997
See application file for complete search history.

(56) References Cited

U.S. PATENT DOCUMENTS

| 5,791,666 | A  | * | 8/1998  | Mainard ................... 280/33.991 |
| 6,926,291 | B1 | * | 8/2005  | Ondrasik ................. 280/33.991 |
| 7,673,886 | B2 | * | 3/2010  | Ondrasik ................. 280/33.991 |
| 8,056,909 | B2 | * | 11/2011 | Burdwood et al. ....... 280/33.991 |
| 2003/0080024 | A1 | * | 5/2003 | Vourganas ............. B65D 19/18 206/600 |
| 2003/0116933 | A1 | * | 6/2003 | Nadeau et al. ........... 280/33.991 |
| 2004/0201187 | A1 | * | 10/2004 | Ondrasik ................ 280/33.991 |
| 2011/0115176 | A1 | * | 5/2011 | Giampavolo et al. .... 280/33.993 |
| 2013/0140778 | A1 | * | 6/2013 | Stauff et al. ............. 280/33.996 |

* cited by examiner

*Primary Examiner* — Brodie Follman
*Assistant Examiner* — Brian Cassidy
(74) *Attorney, Agent, or Firm* — Gordon Rees Scully Mansukhani LLP (57) ABSTRACT

A nestable shopping cart having a fixed child seat and a tubular frame construction basket providing strong and rigid construction with a reduced number of parts.

6 Claims, 10 Drawing Sheets

TUBULAR FRAME SHOPPING CART

TECHNICAL FIELD

The present invention relates to shopping carts.

BACKGROUND OF THE INVENTION

This invention relates generally to shopping carts and is particularly concerned with improved shopping cart strength and durability and ease of manufacture.

Traditional shopping carts have been made of bent wire stock for the basket side walls. If a child seat is provided it is attached at its lower end to the rear wall, and is pivoted away from the rear wall to use the seat. On nesting, the child seat is collapsed and the seat and rear wall are lifted by the front end of a cart nesting in from the rear. At the same time, the lower tray is also pivoted and is lifted by the lower end of the nesting cart. The various movable parts of such carts, to permit nesting, will tend to rattle as the cart travels, and also make nesting more difficult. Separating nested carts can also be a problem when there is deformation of the basket due to abuse or heavy loads. When the basket is deformed, the carts can no longer be nested.

U.S. Pat. No. 2,890,057 of Davis describes a conventional type of collapsing baby seat on a cart. Shopping carts are known which have different nesting arrangements, but these are subject to some other disadvantages. In my U.S. Pat. No. 6,126,181, a shopping cart with stepped, completely separate upper and lower baskets is described, in which the lower basket is offset forwardly from the upper basket, so that the lower basket of a rear cart can be nested under the upper basket of a forward cart for storage. The upper basket may include a child seat. However, the baskets are of reduced size and terminate short of the forward end of the cart. The base or lower tray is fixed and is stepped to permit nesting. In my U.S. Pat. No. 6,098,998, a shopping cart is described which has a child seat at the front end of the cart, and a pivoted rear wall for nesting. The lower tray or base is inclined downwardly from the rear to the front end of the cart to permit nesting without having to lift the lower tray, reducing moving parts. In my U.S. Pat. No. 7,168,711 a fixed baby seat is provided but the structural strength of the cart is compromised because there is no provision for a high strength frame for the basket top or bottom. Also in that patent the parts count is higher than in a conventional cart because of the use of a separate cantilever brace supporting the basket.

SUMMARY OF THE INVENTION

It is an object of the present invention to provide a new and improved shopping cart with an improved strength and quietness when in use.

It is a further object of the present invention to provide a new and improved shopping cart with a fixed child's seat, but wherein the shopping carts are still nestable with one another.

According to the present invention, a shopping cart is provided which comprises a wheeled base having a front end and a rear end, a rear frame projecting upwardly from the rear end of the base and having a handle at its upper end, a basket having a rear end secured to the frame and projecting forwardly from the frame at a spacing above the base, the basket having a front wall, spaced side walls, a lower wall, and an open rear end below the basket. The rear frame is also forms the handle and is sometimes referred to herein as the handle frame. A fixed child seat secured to the handle frame adjacent the upper end of the frame, and a rear gate pivoted below the child seat to close the open rear end of the basket, whereby two or more carts can be nested together by pushing the front wall of the basket of a first cart through the rear frame beneath the fixed child seat of a second cart, simultaneously pivoting the rear gate upwardly to allow the basket of the first cart to enter the basket of the second cart.

An embodiment of this invention provides a nestable cart with a fixed child seat at the rear end of the cart, close to the customer pushing the cart. In an exemplary embodiment of the invention, the side walls of the basket have a raised rear portion and a downwardly stepped front portion, and the child seat is secured between the raised rear portions of the side walls such that a base of the seat is spaced above the downwardly stepped front portion of the side walls and the seat extends forwardly from the rear frame.

Unlike conventional carts the upper rim of the basket and the raised rear portion of the sides have tube stock extending all the way from the handle frame along the raised portion and down to the forward part of the basket rim. This tube stock (as opposed to "wire") construction advantageously gives the present invention added strength over previous shopping cart designs, and is easier and less expensive to manufacture.

The lower end of the basket is also formed from tube stock which is bent into a general U-shape and secured to the handle frame. This advantageously provides a frame with very high strength. The tubes on the upper and lower portions of the basket are preferably connected in the front by bumper shields that are formed from sheet steel or tubing sections and may be covered by plastic bumper covers to prevent marring. The lower tube of the basket is also bent into a generally U-shaped configuration and is terminated on the handle frame such as by welding.

In the exemplary embodiment, the tube stock comprises tubes that are generally circular in cross-section but the term "tubes" as used herein is intended to include tubes that may be oval, flat, rectangular or of any other shape having an open interior that provides the requisite strength.

The basket sides and front wall, in the exemplary embodiment, are formed of generally horizontal and vertical wires with extra length vertical wires at intervals. The tubes are drilled at intervals to correspond with extra length extended projections (rods or blades) which extend from the upper and lower edges of the sides.

In an exemplary embodiment, the sides of the shopping cart can be removed and replaced. Using the drilled tubing on the upper and lower edges of the basket and raised portion makes it easy to substitute different sides of different configuration or of different colors. In operation, the sides are freed of their vertical restraints, and are merely lifted vertically until the extended rods at the bottom of the side clear the holes in the lower tubes and then pivot the side out of engagement and lower it. The lower tubing also serves to support the floor of the basket.

The sides may be secured into position as in the exemplary embodiment by rings attached to the extended wires immediately below the upper tube to prevent the lifting and disengagement of the sides. If desired, such a ring can be removed with a special tool, which allows for any easy replacement of the sides but resists tampering. Other structures can be employed to prevent lifting of the sides and such structures are referred to generally as vertical restraint (e.g.: welds, pins or dimples at the top or bottom).

In an exemplary embodiment of the invention, the base of the cart comprises a generally U-shaped tubular frame projecting forwardly from a brace that extends to and is secured to the handle frame and having an open rear end, the frame having inwardly tapered side walls for permitting nesting. A wire rod tray is secured to the frame.

The handle frame is generally U-shaped and extends below the basket to engage the tubing of the base. For additional support and strength an extended portion of the handle frame may be bent so that it extends upwardly to engage and be attached to the basket frame tubing. This section of the handle frame provides support for the forward cantilevered portion of the basket.

In addition to the use of a wire frame panels for the basket, it is also possible to form the sides of the basket of relatively low strength materials such as molded plastic, stamped metal or plastic sheets, carbon fibers, fiber glass or other relatively low strength materials, because the sides of the basket are not relied upon for the overall strength and rigidity of the present design.

The shopping cart of the present invention has many advantages. For example, it has a significantly reduced number of moving parts, only requiring a small, relatively light rear gate (with only two pivot points) for nesting, and has provision for a fixed child seat which is more stable and secure. A fixed child or baby seat has many advantages over traditional, collapsible child seat assemblies. For example, the fixed baby seat does not rattle, is lighter, does not damage seat belts, and provides a much larger "small item" basket when not needed for a child or baby. A fixed seat makes carts nest more easily and the carts are less likely to jam or become stuck together. This new cart design will require significantly less maintenance than traditional carts with baskets made entirely of wires.

The present invention will be better understood from the following detailed description of an exemplary embodiment of the invention, taken in conjunction with the accompanying drawings in which like reference numerals refer to like parts and in which:

DETAILED DESCRIPTION OF THE DRAWINGS

Figure 1:
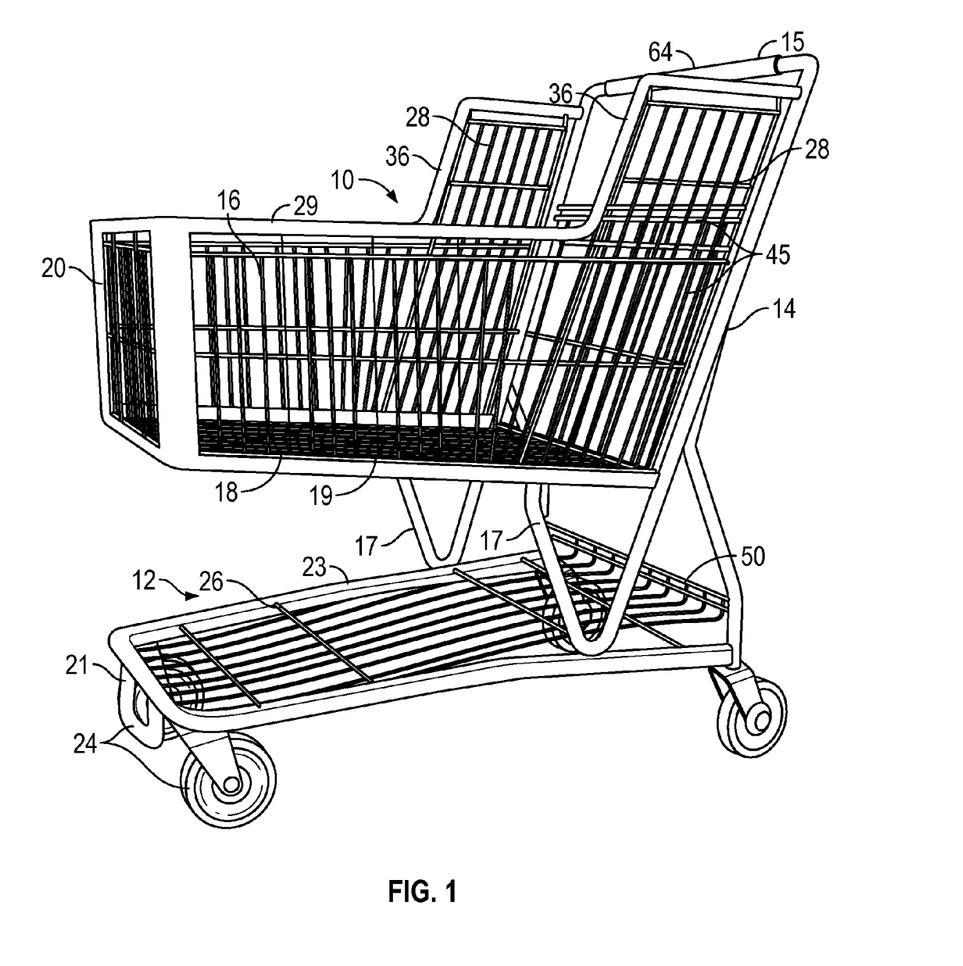
FIG. 1 is a front perspective view of a shopping cart according to an exemplary embodiment of the invention showing the front bumper shields.

The drawings illustrate a shopping cart 10 according to an exemplary embodiment of the present invention. As best illustrated in FIG. 1, the cart 10 basically comprises a wheeled base 12, a rear handle frame 14 projecting upwardly from the base 12 at the rear end of the cart and having a handle 15 at its upper end. A basket 16 projects forwardly from the rear frame 14 at a location spaced above the base 12. Basket 16 has a floor 18, spaced side walls 19, and a front end wall 20, which in the exemplary embodiment are all of wire grille construction. Curved bumper sections 41 (FIG. 2) both protect other carts from damage and provide additional rigidity to the basket. If desired, bumper sections 41 can be covered with plastic material to further reduce marring.

Base 12 comprises a generally U-shaped frame 22 with its narrowest width being at the front 21 with tubing 23 tapering outwardly from the front to the rear end of the cart, with the frame being open at its rear end, front caster wheels 24 and rear caster wheels 25, and a tray 26 welded to the tubing 21, 22 and 23 to support items on the base of the cart.

Each side wall 19 (of basket 16) has a raised rear end portion 28 and a downwardly stepped portion projecting forwardly from the rear end portion to the front end wall 20.

For additional support and strength an extended portion 17 of handle frame 16 may be bent so that it extends upwardly to engage and be attached to the bottom of basket 16 to provide support for the forward cantilevered portion of the basket.

Figure 2:
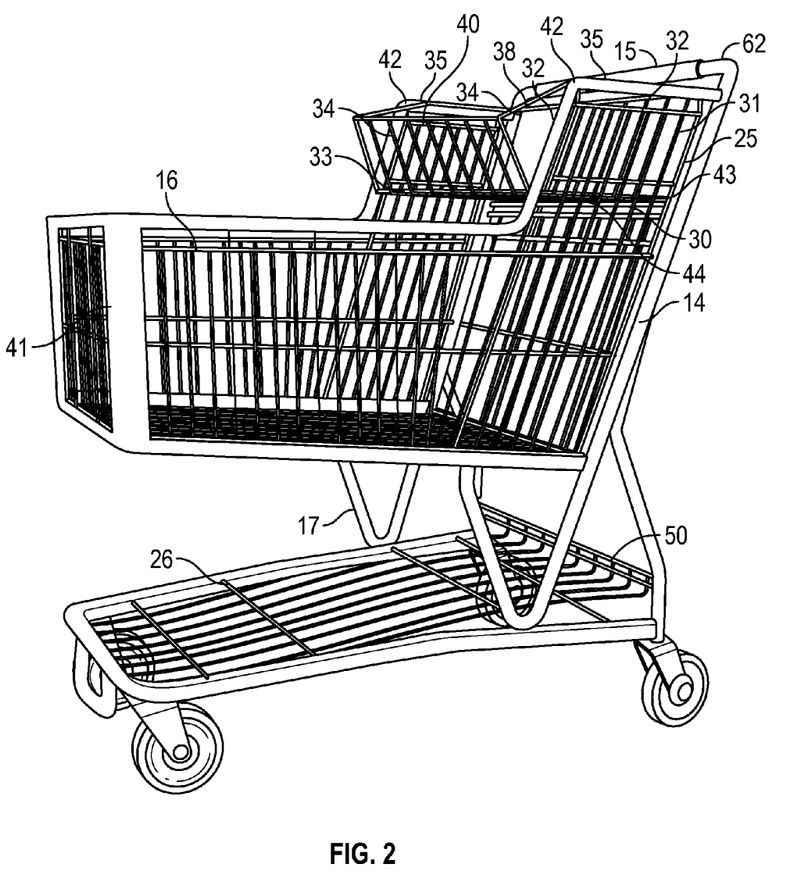
FIG. 2 is a front perspective view of the shopping cart showing the seat frame.

Referring to FIG. 2, a fixed child or baby seat 30 is secured between the raised rear end portions 28 of the side walls at the rear end of the cart. The seat 30 has a rear wall 31 with leg openings 32, a base 33, and a front wall 34. Optionally, front wall 34 may be straight, or it may be inclined forward to more comfortably support the child's back. Optionally, the inclination of front wall 34 may even be adjustable. The base is located above the downwardly stepped portions of the side walls. The rear wall 31 may be secured by welding or the like between opposite sides of the handle frame 14 adjacent handle 15, as indicated. The front wall 34 may be secured by welding or like to the raised rim tubing 35 of the opposite raised rear portions 28 of the side walls of the basket, adjacent the step 36 down to the downwardly stepped tubing portion 29 of each side wall.

Figure 3:
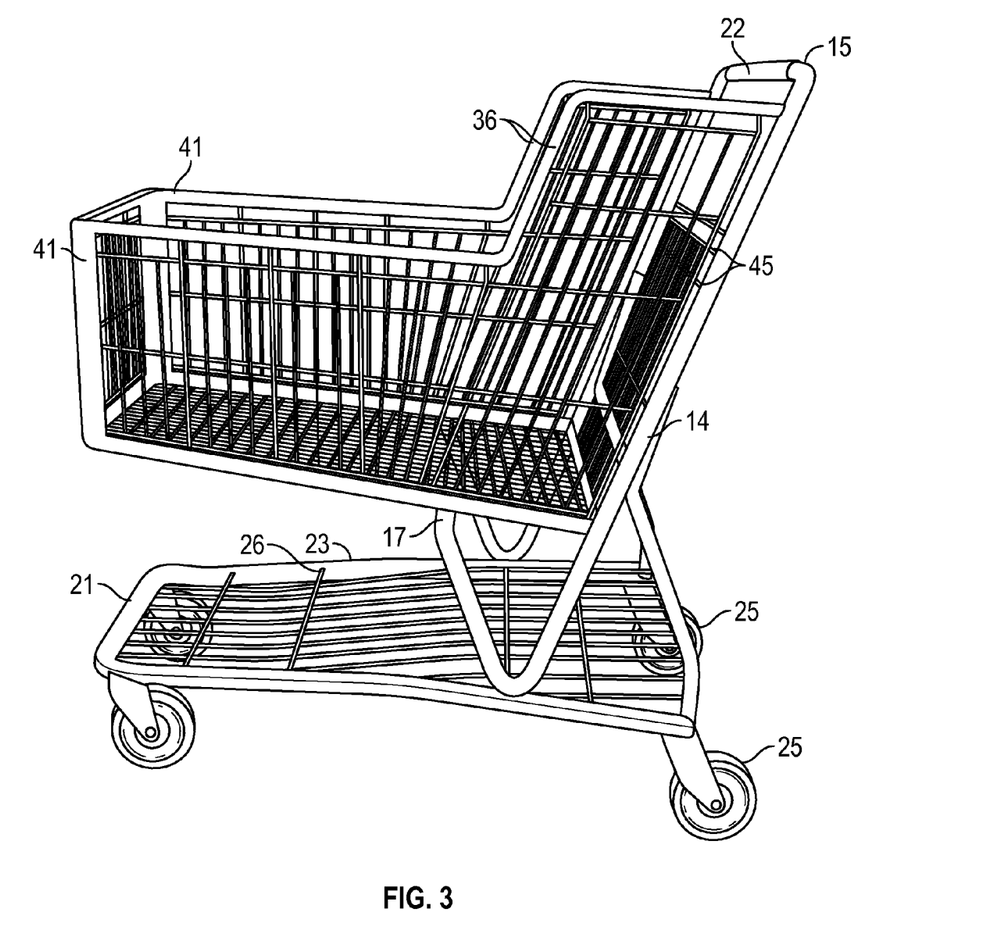
FIG. 3 is a side perspective view slightly from the rear which shows the rear gate clearly.

In the illustrated embodiment, the rear wall of the seat has an upper rail 38 which has opposite ends welded to opposite sides of the rear frame 14 at a small spacing below handle 15, as best illustrated in FIG. 3. The front wall 34 has an upper rail 40 with hooked ends 42 which are hooked or snapped over opposite portions of the upper rim 35 of the raised portion 28 of each side wall of the basket. The lower rail 43 of the rear wall may also be welded to opposite sides of the rear frame 14. In an alternative embodiment, the rear and front walls 31, 34 of the seat are both welded to opposing portions of the side walls at their upper and possibly also the lower corners.

The child or baby seat has a conventional plastic flap 44 for supporting a child in the lowered position. This is pivoted to the rear wall so that it may be raised in a conventional manner to cover openings 32 when it is desired to use the child seat as an auxiliary basket for carrying small items.

The rear end of the main basket 16 is open beneath child seat 30, and a rear gate 45 (see FIG. 3) of lightweight construction is pivoted to the lower rail 43 of the child seat so as to close the open rear end of the basket while in use. Rear gate 45 will be lifted inwardly and upwardly when another cart is nested in from the rear with another cart.

Lower tray 26 is welded between opposite sides of the base frame tubing 22 and 23 and slopes downwardly toward the front of the cart. The rearmost portion of the lower tray has a rim 50 (FIG. 1) which is welded between opposite sides of handle frame 14. In other embodiments, the lower tray may be eliminated, so that the base comprises only the lower, U-shaped frame.

In an exemplary embodiment of the invention, a sleeve or cover 62 (FIGS. 1 and 2) of plastic or the like is also snapped over handle 15.

Nesting of two or more carts to conserve space when the carts are not in use will now be described. The rear cart is pushed into the rear end of the forward cart, so that the front end wall 20 of the rear cart basket pushes up the rear gate 45 of the front cart basket, and the rear cart basket slides into the front cart basket under the front child seat 30. At the same time, the front end of the wheeled base 12 of the rear basket will enter the space beneath the rear end of the tray of the front basket.

Figure 4:
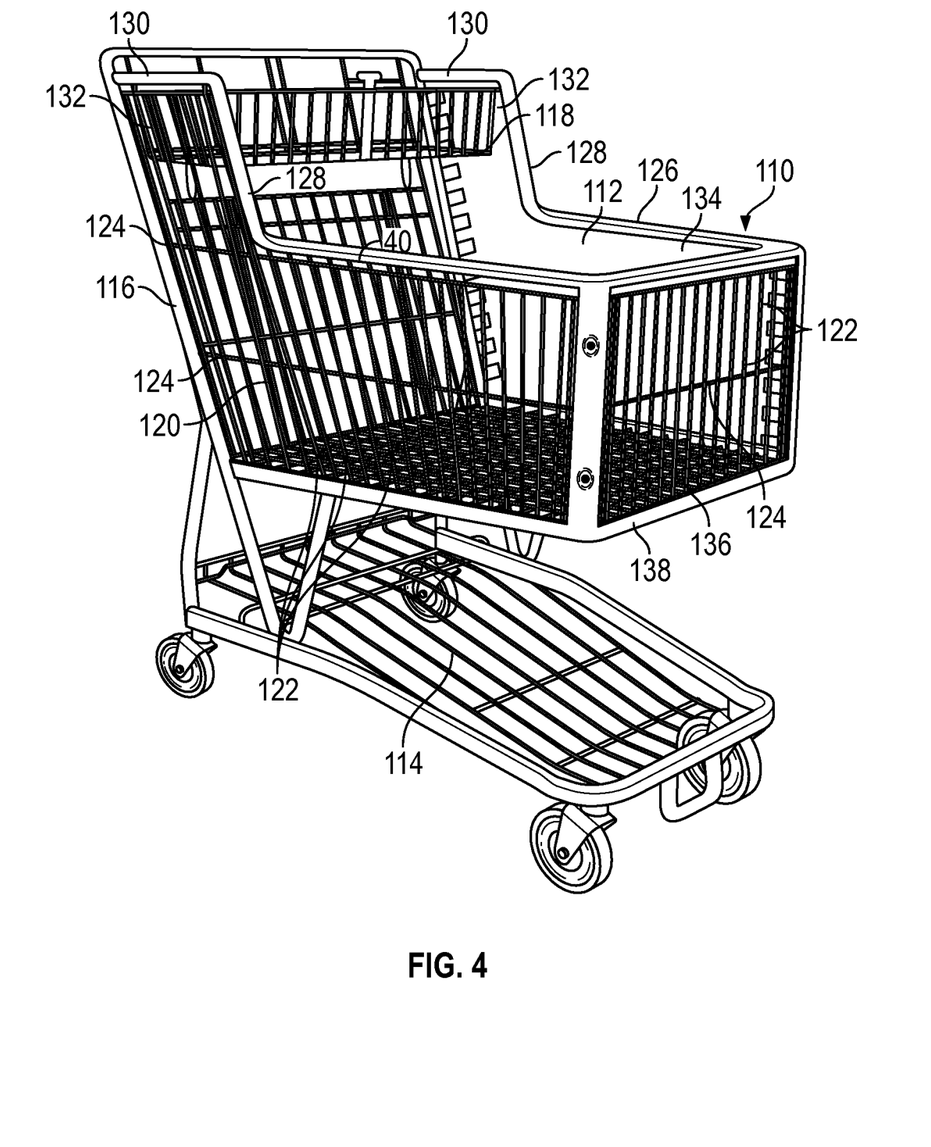
FIG. 4 is a front perspective view of an alternate embodiment of the shopping cart with the basket having a tubular frame and removable side panels.

FIG. 4 shows a modified embodiment of the shopping cart. In the cart 110, a plated tubular frame replaces the wire basket 12, wire base 14, and wire handle frame 16 seen in FIGS. 1 and 2. Sides 134 and 120 are comprised of right angularly arranged wires which are collectively referred to as a grid.

The basket 112 has a top generally U-shaped top basket frame 126 which incorporates inclined sections 128 and top sections 130 which together form raised rear sides 132. The bottom of the basket 136 is framed by generally U-shaped tubular frame 138. The basket is comprised of side grids 120 and 134 made of vertical wires such as exemplary wires 122 and horizontal wires 124. The front of the basket is formed by grid 136. The vertical wires 122 include spaced wires such as exemplary wires 144 (FIG. 5), that are longer than the distance between the top frame 126 and the bottom frame 138 in the same manner as is shown in FIG. 1. As will be explained with reference to FIGS. 6A and 6B, the elongated members can be received in openings in the bottom of the top frame and the top of the bottom frame. The removal of the side and front basket grids can be prevented by crimped clips 140 (see FIG. 5).

Figure 5:
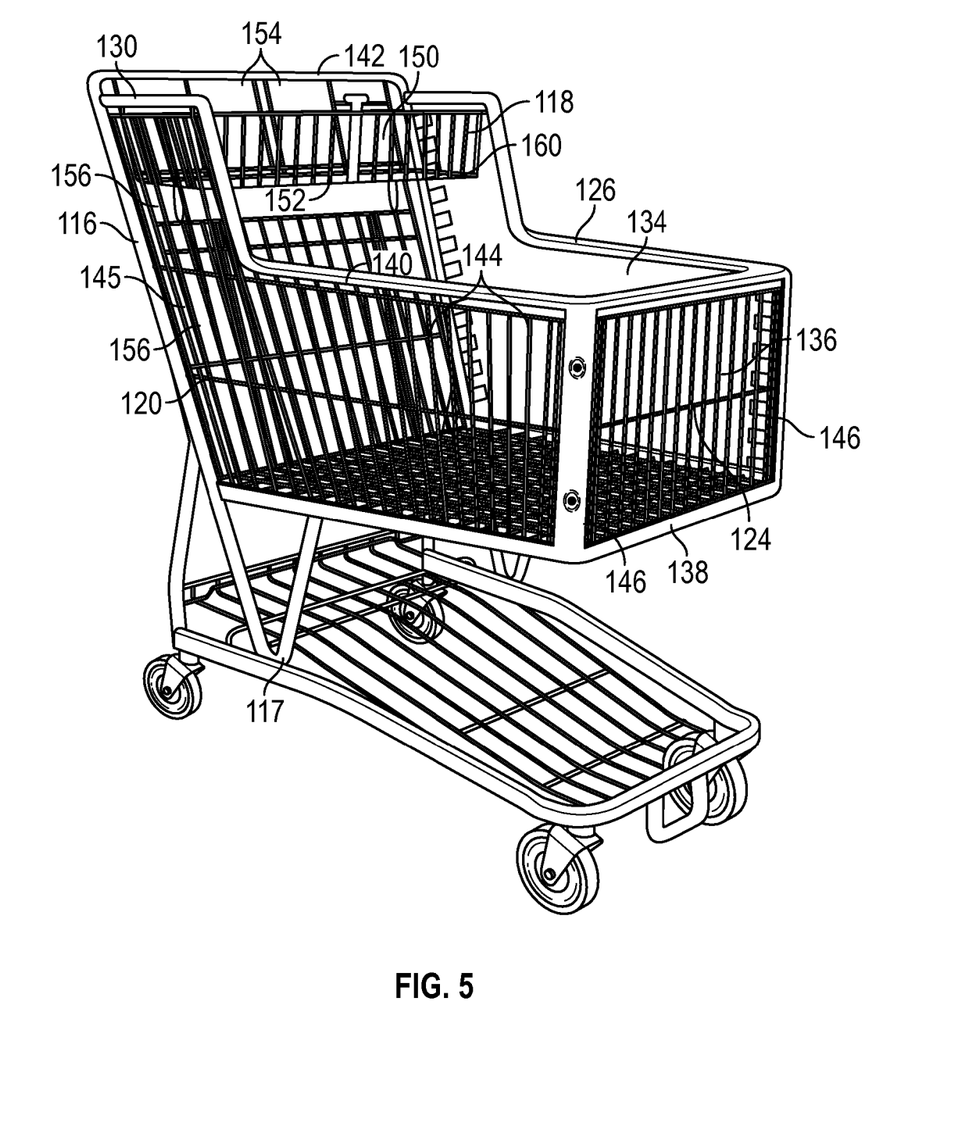
FIG. 5 is a view similar to FIG. 4, with additional part numbers labelled thereon.

Referring to FIG. 5, a fixed child seat 118 is fixedly attached to the handle frame 116 at the handle portion 142 and to the top portion 130 of the top basket frame 126. The seat has a seat back 150, a flip up seat 152 and leg openings 154.

The top frame 126 and bottom frame 138 are spaced, secured to, and reinforced by, the attachment to the handle frame 116 and by the corner posts 146 which are shown in their alternate form as tubular posts rather than the corner shields of FIGS. 1, 2 and 3. The corner posts 146 have fastener openings 148 which can secure the forward end of the side grids 120 and 124, and the sides of the front grid 136.

The rear gate 145 is hinged by a rod (not shown) that extends through the end loops 158 and 160 and into the handle frame 116. When another cart is to be nested within the illustrated cart, rear gate 145 is pushed upwardly and can be raised all the way to a horizontal orientation without interfering with the seat 118.

The shopping cart of the present invention has many advantages over more traditional carts. For example, it can have a fixed child seat and a fixed lower tray, avoiding the need to have a liftable and collapsible baby seat, and a liftable lower tray. Having fewer moving parts is advantageous since it reduces rattling when the cart is in use, and makes carts lighter, easier to nest, less liable to jam together when nested, and will require significantly less maintenance. In the illustrated embodiments, the baby seat is secured between raised side portions of the basket side walls. However, it will be understood that the basket may have side walls of uniform height in alternative embodiments, and the baby seat may be simply welded to the rear frame of the cart to project forwardly from the rear frame above the basket. These alternatives are facilitated by the fact that the tubular frames and bumper shields that define the basket increase the strength and rigidity of the basket. When provided the fixed baby seat also provides a much larger "small item" basket, is less liable to cause damage to seat belts in the baby seat for holding a child in place.

Another advantage of having fewer moving parts is that it will reduce wear in carts which are powder coated rather than chrome plated. By providing forward corner bumper shields 41, the risk of damage to the powder coating during nesting is reduced or eliminated and contact between the power coated portions of the baskets is minimized.

The present tubular members described herein (including base elements 21, 22 and 23; basket elements 29, 129, 38, 138, 26 and 126; and frame elements 14, 16) can preferably be made of tubular (round, elliptical, rectangular or open tubing of any cross section) members having widths ranging from ¼ inch to 1½ inches. Typically, major supporting members will have sizes on the order of ⅞ inch or 1 inch. It is to be understood, however, that other dimensions are also contemplated within the scope of the present invention.

Figure 6A:
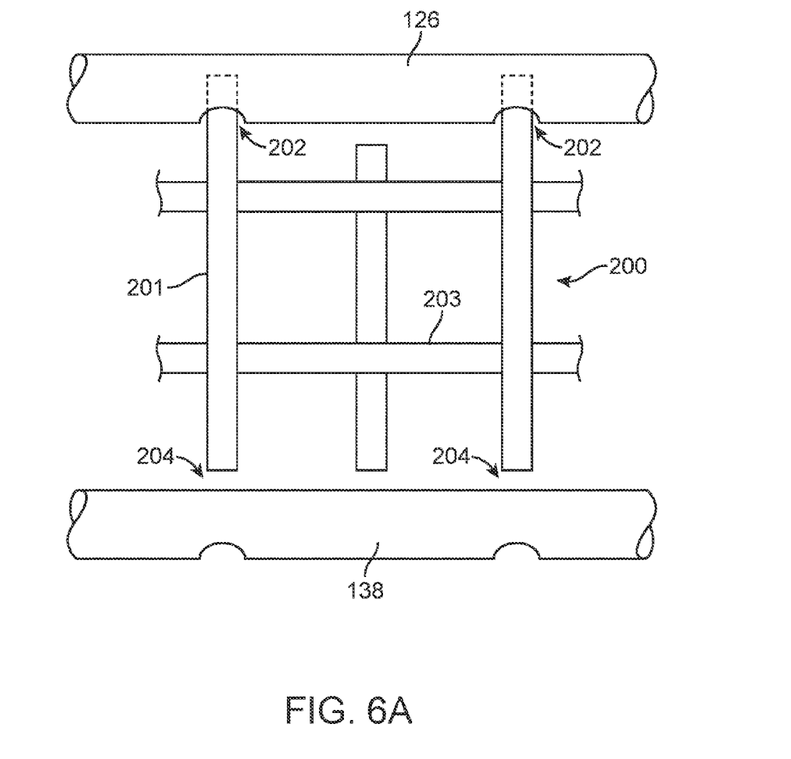
FIG. 6A illustrates a schematic of a side panel being inserted to form a wall of the shopping basket.
Figure 6B:
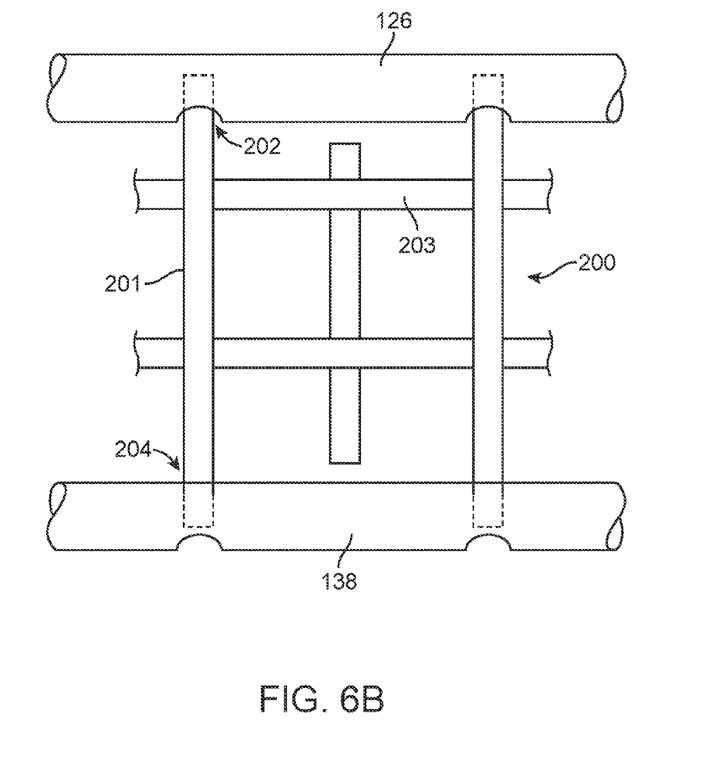
FIG. 6B is a schematic of the side panel of FIG. 6A after the side panel has been inserted to form a wall of the shopping basket.

Referring next to FIGS. 6A and 6B, the insertion of a removable side panel 200 will be shown. Side panel 200 has vertical members 201 and horizontal members 203. The top ends of vertical members 201 are inserted into holes 202 as seen in FIG. 6A. Next, the bottom ends of vertical members 201 are inserted into holes 204, and panel 200 is released such that it falls into the position shown in FIG. 6B. Hidden portions of vertical members 201 are illustrated in dotted lines. Vertical members 201 are of such a length that they can be moved above holes 204 when lifted, but do not fall out of holes 202 when released. In various embodiments, the top and bottom of vertical members 201 can be fixed into position in holes 202 and 204 by locking rings, clips, pins, dimples, etc.

Figure 7:
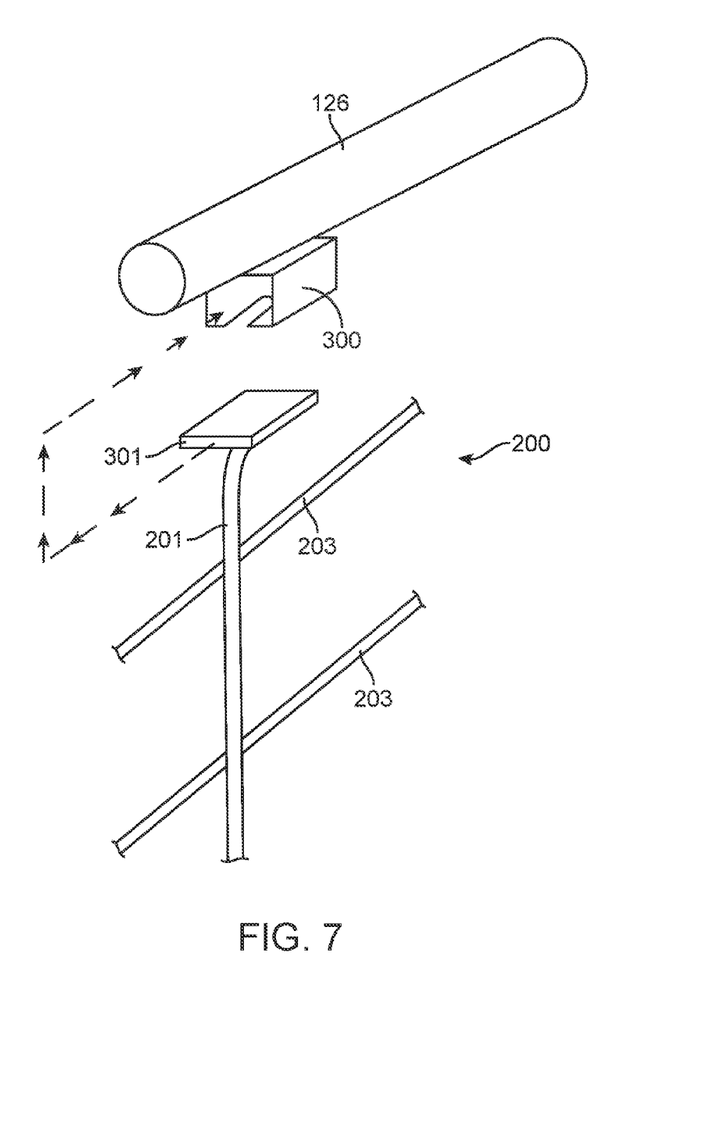
FIG. 7 is an alternate system for attaching a basket side panel to the tubular frame.

FIG. 7 illustrates another optional system for attaching side panels 200. In this system, tubular member 126 has a bracket 300 attached to its underside. Vertical member 201 has a top mount 301 which is moved (in the position of the dotted line arrow) to anchor it into position. Top mount 301 may be made in various shape and dimensions. It may be round, rectangular or even T-shaped.

In further alternate embodiments, the top ends of vertical members 201 may be L-shaped and may be slipped or rotated into position in holes 202. Moreover, the child's seat of the present invention may also be installed in a manner similar to that described with reference to side panel sections 200.

Figure 8A:
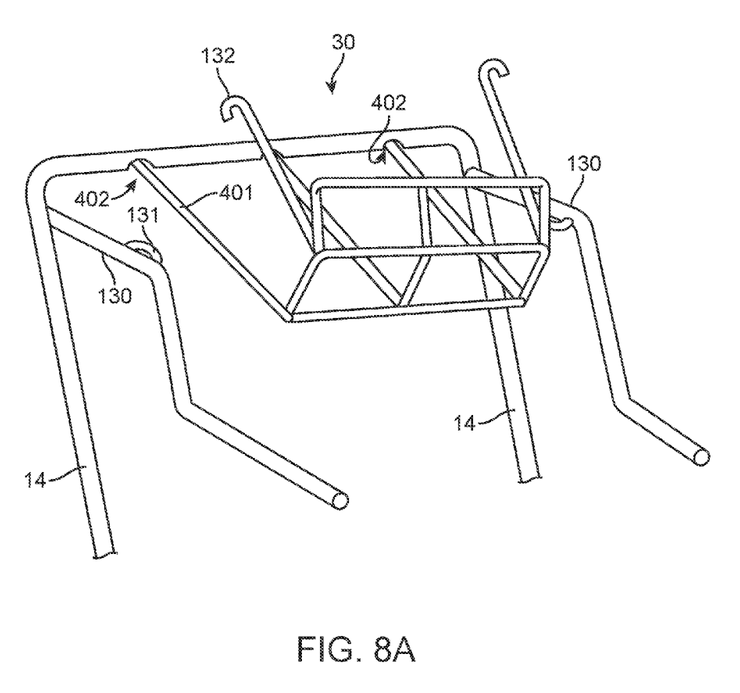
FIG. 8A is a schematic close-up of an optional system for affixing the child's seat to the frame, as the child's seat is initially inserted.
Figure 8B:
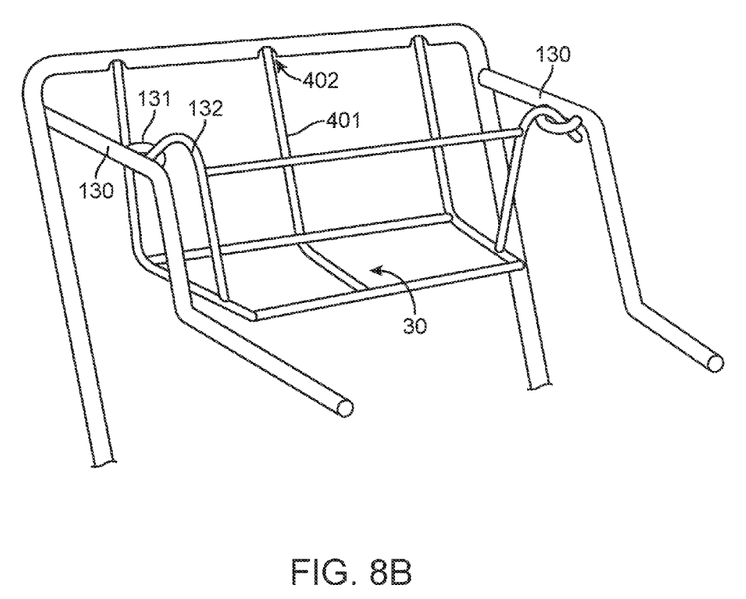
FIG. 8B is a schematic close-up corresponding to FIG. 8B, but after the seat has been rotated down into its final position.

FIGS. 8A and 8B show sequential steps in which the child's seat is optionally attached to the frame. In FIG. 8A, child's seat 30 comprises vertical members 401 which have top ends received up into holes 402. Preferably, the top ends of vertical members 401 are L-shaped, and the top ends anchor into holes 402 when rotated to the position of FIG. 8B. In addition, tubular frame members 130 preferably have a loop 131 and the child's seat 35 has a hook member 132. When the child's seat 35 is rotated down to the position of FIG. 8B, the top ends of hook members 132 are received into loops 131, as shown. Combined with the locking of top ends of vertical members 401 into holes 402, a sturdy seat construction design is shown. (Note: for clarity of illustration, some of the members are omitted from FIGS. 6A to 8).

Although some exemplary embodiments of the invention have been described above by way of example only, it will be understood by those skilled in the field that modifications may be made to the disclosed embodiments without departing from the scope of the invention.

What is claimed is:

1. A shopping cart comprising:

A wheeled base having a tubular front end, a tubular rear end, and two tubular sides forming a generally horizontal rectangle with two front swivel wheels mounted to the front corners and two rear aligned wheels mounted the rear corners;

A generally vertical upside down "U" shaped tubular rear frame projecting upward from opposite sides of the rear end of the base and forming a handle at its upper closed end;

A basket having;
   a rectangular front wall frame having an upper front member, a lower front member and two vertical side front members forming a front opening, and
   two spaced side wall frames each having an upper side member and a lower side member connecting the upper corner of the front wall frame to the rear frame and a lower side member connecting the lower corner of the front wall frame to the rear frame forming two side openings,
   the space between lower front member and the two opposed lower side members forming a bottom opening;

An "L" shaped child seat secured to the handle at the upper portion thereof and to the opposed upper side members;

A rear rotatable gate mounted to a rear support connected between the opposed sides of the rear frame below the child seat to pivot inwardly and back to open and close the rear end of the basket;

A front panel sized to removably mount within the front opening, two side panels sized to removably mount within the two side openings, and a bottom panel sized to mount within the bottom opening, each panel having a perimeter element and an array of internal elements; and Means for removably mounting the front panel in the front opening and the two side panels in the side openings, wherein the means for removably mounting the front panel in the front opening and the two side panels in the side openings comprises each panel having a plurality of upward projections from the upper portion of the perimeter element and a plurality of longer downward projections from lower portion of the perimeter element, and a plurality of openings in the respective upper and lower front or side members to receive the respective upward projections in the openings in the upper front or side members and the downward projections in the respective openings in the lower front or side members.

2. The shopping cart of claim 1, further comprising bumper shields on the front edges of the basket.

3. The shopping cart of claim 1 wherein the upper side members of the basket frame have a raised rear portion and a downward stepped front portion.

4. The shopping cart of claim 1 wherein the rear frame includes an extension from each lower portion of the rear frame which is bent up and extends to connect to the lower side members of the basket forward of the rear frame to provide intermediate support to the basket frame.

5. The shopping cart of claim 1, wherein both the basket and the wheeled base are tapered back to front so as to permit nesting of a rear cart into a forward cart.

6. The shopping cart of claim 1, wherein all members of the front wall frame and the two side wall frames are tubular.

* * * * *